United States Patent
Kinoshita et al.

(10) Patent No.: US 9,701,291 B2
(45) Date of Patent: Jul. 11, 2017

(54) VEHICLE BRAKE HYDRAULIC PRESSURE CONTROL APPARATUS

(71) Applicants: AUTOLIV NISSIN BRAKE SYSTEMS JAPAN CO., LTD., Ueda-shi, Nagano (JP); HONDA MOTOR CO., LTD., Minato-ku, Tokyo (JP)

(72) Inventors: Takashi Kinoshita, Ueda (JP); Kohei Akamine, Wako (JP); Masaki Koike, Wako (JP)

(73) Assignees: HONDA MOTOR CO., LTD., Tokyo (JP); AUTOLIV NISSIN BRAKE SYSTEMS JAPAN CO., LTD., Nagano (JP)

( * ) Notice: Subject to any disclaimer, the term of this patent is extended or adjusted under 35 U.S.C. 154(b) by 0 days.

(21) Appl. No.: 14/861,473

(22) Filed: Sep. 22, 2015

(65) Prior Publication Data
US 2016/0009262 A1 Jan. 14, 2016

Related U.S. Application Data

(63) Continuation of application No. PCT/JP2014/058218, filed on Mar. 25, 2014.

(30) Foreign Application Priority Data

Mar. 29, 2013 (JP) ................. 2013-071335

(51) Int. Cl.
*B60T 8/66* (2006.01)
*B60T 8/173* (2006.01)
(Continued)

(52) U.S. Cl.
CPC ............... *B60T 8/173* (2013.01); *B60T 7/12* (2013.01); *B60T 8/171* (2013.01); *B60T 8/245* (2013.01);
(Continued)

(58) Field of Classification Search
CPC .......... B60T 8/173; B60T 7/042; B60T 8/171; B60T 8/172; B60T 7/12; B60T 8/245;
(Continued)

(56) References Cited

U.S. PATENT DOCUMENTS

2014/0372004 A1* 12/2014 Kinoshita ............. B60T 8/4081
  701/70
2016/0075316 A1* 3/2016 Kinoshita ............... B60T 7/042
  701/70

FOREIGN PATENT DOCUMENTS

DE        10314998 A1    6/2004
DE  10 2007 030254 A1    1/2008
(Continued)

OTHER PUBLICATIONS

International Search Report issued in PCT/JP2014/058218 on Jun. 24, 2014.
(Continued)

*Primary Examiner* — Pamela Rodriguez
(74) *Attorney, Agent, or Firm* — Hamre, Schumann, Mueller & Larson, P.C.

(57) ABSTRACT

A vehicle brake hydraulic pressure control apparatus includes, as a controller, acceleration acquiring section for acquiring an output value of an acceleration sensor detecting a front-rear direction acceleration of a vehicle, limiting section for limiting the magnitude of the output value acquired by the acceleration acquiring section within a predetermined limit value, a filter (control acceleration calculation section) limiting a change of a value output by the limiting section in a predetermined direction, and holding section for determining a holding pressure according to a value output by the filter and, based on the holding pressure, holding the braking force.

12 Claims, 6 Drawing Sheets

(51) Int. Cl.
  *B60T 7/12*          (2006.01)
  *B60T 13/14*       (2006.01)
  *B60T 13/66*       (2006.01)
  *B60T 13/68*       (2006.01)
  *B60T 8/171*       (2006.01)
  *B60T 8/24*         (2006.01)

(52) U.S. Cl.
  CPC .......... *B60T 13/146* (2013.01); *B60T 13/662* (2013.01); *B60T 13/686* (2013.01); *B60T 2201/04* (2013.01); *B60T 2201/06* (2013.01)

(58) Field of Classification Search
  CPC ...... B60T 13/662; B60T 13/74; B60T 13/686; B60T 2201/06; B60T 2201/04; B60T 13/146; G01P 13/00; B60W 30/18118; B60W 2550/142
  USPC ....... 303/159, 157, 158, 155, 160, 191, 192; 701/70, 78, 83
  See application file for complete search history.

(56) References Cited

FOREIGN PATENT DOCUMENTS

| | | |
|---|---|---|
| EP | 1 806 266 A1 | 7/2007 |
| JP | 2-132526 U | 11/1990 |
| JP | 2009-202665 A | 9/2009 |
| JP | 2012-11935 A | 1/2012 |
| JP | 2012-240641 A | 12/2012 |

OTHER PUBLICATIONS

Supplementary European Search Report issued in connection with counterpart European Patent Application No. 14773191.3 on May 6, 2016.

Office Action issued for Chinese application No. 201480018887.5, dated Nov. 28, 2016, 11 pages including English translation.

\* cited by examiner

VEHICLE BRAKE HYDRAULIC PRESSURE CONTROL APPARATUS

TECHNICAL FIELD

The present invention relates to a vehicle brake hydraulic pressure control apparatus capable of holding a brake hydraulic pressure when the vehicle is at a halt.

BACKGROUND ART

There is a known braking force holding control apparatus for holding a braking force when the vehicle is at a halt (PATENT LITERATURE 1). The apparatus disclosed in PATENT LITERATURE 1 has a filter for limiting changes of an output by an acceleration sensor for calculating a road surface gradient. In such a structure, it is possible to suppress changes of acceleration values due to pitching movement, which is a front-rear swing caused when the vehicle halts.

In addition, the vehicle braking force holding control apparatus determines a braking force to be held according to the filtered acceleration to stop the vehicle even on a slope.
PATENT LITERATURE 1: JP-A-2009-202665

DISCLOSURE OF THE INVENTION

Technical Problem

However, since the apparatus disclosed in PATENT LITERATURE 1 filters the output value of the acceleration sensor directly so as to suppress a change toward the front of the vehicle, if a large acceleration is temporarily generated toward the rear when the vehicle quickly halts, it takes time until the filtered acceleration value converges. Accordingly, if the braking force is held according to the filtered acceleration, the time for applying a braking force larger than the true braking force necessary for the vehicle to halt becomes longer, easily causing dragging feeling when the vehicle starts from a standstill.

An object of the invention is to provide a vehicle braking force holding control apparatus capable of preventing a needlessly large hydraulic pressure from being held for a long time during hard braking in a vehicle braking hydraulic pressure holding control apparatus holding the brake hydraulic pressure when the vehicle is at a halt.

Solution to Problem

The present invention that solves the above problem is a vehicle brake hydraulic pressure control apparatus capable of performing braking force holding control that holds a braking force for a vehicle to maintain a halt state when the vehicle is at a halt, the apparatus including acceleration acquiring section for acquiring an output value of an acceleration sensor detecting a front-rear direction acceleration of the vehicle, limiting section for limiting a magnitude of the output value acquired by the acceleration acquiring section within a predetermined limit value, a filter limiting a change of a value output by the limiting section in a predetermined direction, and holding section for determining a holding pressure according to a value output by the filter and, based on the holding pressure, holding the braking force.

In the vehicle brake hydraulic pressure control apparatus described above, the limiting section first limits the magnitude of the output value (also referred to as the acquired value in this specification) of the acceleration sensor acquired by the acceleration acquiring section within a predetermined limit value and then the filter limits a change of the limited value in a predetermined direction. That is, a filter limits a change in the output value of the acceleration sensor directly in the related art. However, in the present invention, the limiting section limits the magnitude of the acquired value from the acceleration sensor within the predetermined limit value before the filter processes the value. Accordingly, even if large pitching movement is caused by hard braking and large acceleration toward the front or rear is generated, since the acquired value from the acceleration sensor is within the predetermined limit value, the value processed by the filter is prevented from remaining at a large value for a long time. Accordingly, when the holding section determines the holding pressure according to the value output by the filter and, based on the holding pressure, holds the braking force, it is possible to prevent a needlessly large hydraulic pressure from being held for a long time.

In this apparatus, the filter can be configured to limit a change in a direction in which the value output by the limiting section approaches 0. In this type of filter, the invention is applicable in vehicle holding control that holds a braking force when the vehicle is at a halt regardless of the road surface gradient.

In the apparatus, the filter can be configured to limit a change of the value output by the limiting section in a direction equivalent to the front of the vehicle. In this type of filter, the invention is applicable in HSA (hill start assist) control that temporarily holds a braking force during a halt on an ascending slope.

In the apparatus, the holding section sets the upper limit value of a holding pressure to be determined and the limiting section can use a value obtained by adding a predetermined offset amount to an acceleration value corresponding to the upper limit of the holding pressure as the predetermined limit value.

In such a structure, even when a large acceleration occurs temporarily in a downward direction by pitching during a quick halt on a road surface of a steep gradient, it is possible to prevent the vehicle from sliding down by preventing the holding hydraulic pressure from being reduced to a value smaller than the necessary holding pressure.

In the apparatus, the holding section sets the upper limit value for a holding pressure to be determined and the limiting section can use an acceleration value corresponding to the upper limit of the holding pressure as the predetermined limit value.

In such a structure, it is possible to prevent the brake hydraulic pressure from being held at a needlessly large hydraulic pressure, thereby suppressing needless energy consumption.

In the structure in which the offset amount is added to the limit value, the filter limits a change of the value output by the limiting section in a predetermined direction within a predetermined gradient and the predetermined offset amount can be set to a value obtained by multiplying a half cycle of pitching of the vehicle by the predetermined gradient.

In such a structure, the offset amount can be set to a necessary and sufficient magnitude, preventing the brake hydraulic pressure from being held at a needlessly large holding hydraulic pressure and the vehicle from sliding down effectively even during hard braking on a road surface of a steep gradient.

DESCRIPTION OF EMBODIMENTS

Next, an embodiment of the present invention will be described with reference to the drawings as appropriate.

Figure 1:
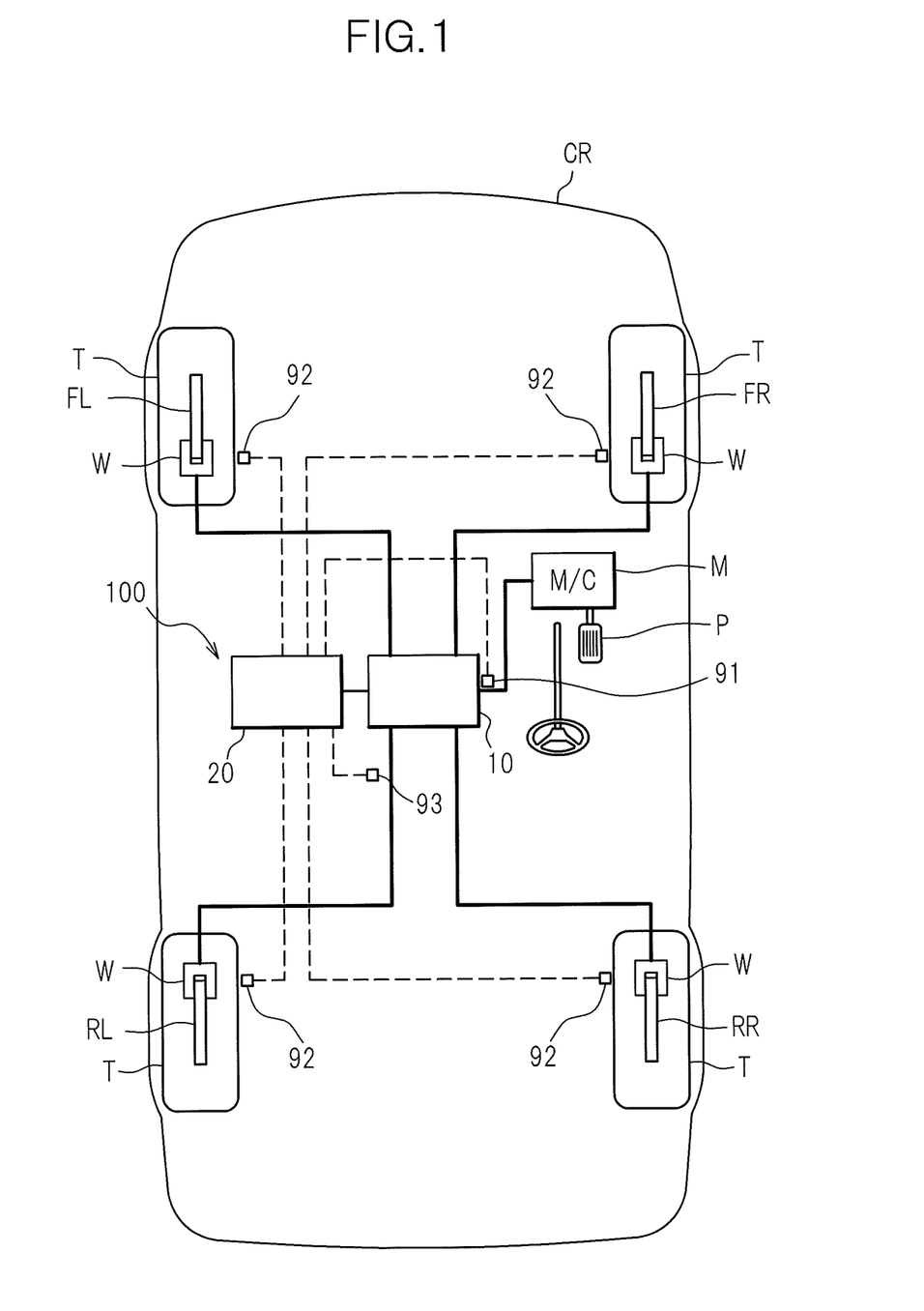
FIG. 1 is a structural diagram showing a vehicle including a vehicle brake hydraulic pressure control apparatus according to the present invention.

As shown in FIG. 1, a vehicle brake hydraulic pressure control apparatus 100 controls the braking force applied to wheels T of a vehicle CR as appropriate. The vehicle brake hydraulic pressure control apparatus 100 mainly includes a hydraulic pressure unit 10 in which fluid lines and various components are provided and a controller 20 controlling various components in the hydraulic pressure unit 10 as appropriate.

The wheels T include wheel brakes FL, RR, RL, and FR and each of the wheel brakes FL, RR, RL, and FR is provided with a wheel cylinder W generating a braking force using a hydraulic pressure supplied from a master cylinder M as a hydraulic pressure source. The master cylinder M and the wheel cylinders W are connected to the hydraulic pressure unit 10. The brake hydraulic pressure generated by the master cylinder M according to the depression force (the driver's braking operation) of a brake pedal P is controlled by a controller 20 and the hydraulic pressure unit 10 and then supplied to the wheel cylinders W.

A pressure sensor 91 detecting a master cylinder pressure (hydraulic pressure in the master cylinder M), a wheel speed sensor 92 detecting the wheel speeds of the wheels T, and an acceleration sensor 93 detecting an acceleration applied to the vehicle CR are connected to the controller 20. The controller 20, which includes, for example, a CPU, a RAM, a ROM, and an input-output circuit, carries out control by performing various types of computation based on inputs from the sensors 91 to 93 and programs and data stored in the ROM. Details on the controller 20 will be described later.

Figure 2:
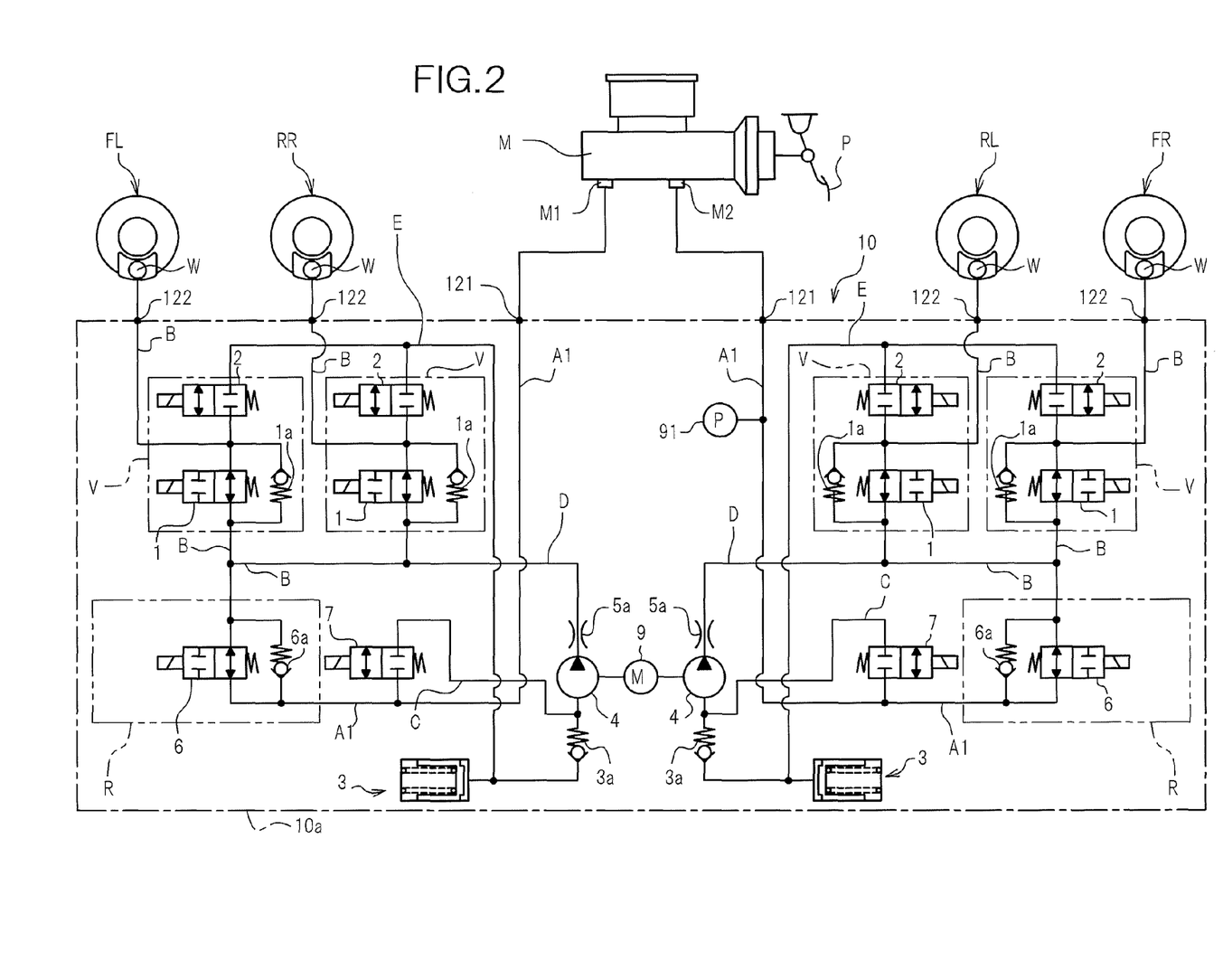
FIG. 2 is a structural diagram showing the structure of a hydraulic pressure unit.

As shown in FIG. 2, the hydraulic pressure unit 10 is disposed between the master cylinder M, which is a generation source generating a brake hydraulic pressure that depends on the depression force applied to the brake pedal P by the driver, and the wheel brakes FR, FL, RR, and RL. The hydraulic pressure unit 10 includes, a pump body 10a, which is a base body having fluid lines (hydraulic pressure lines) through which a brake fluid circulates, a plurality of inlet valves 1 and outlet valves 2 disposed in the fluid lines, and so on. Two output ports M1 and M2 of the master cylinder M are connected to inlet ports 121 of the pump body 10a and outlet ports 122 of the pump body 10a are connected to the wheel brakes FR, FL, RR, and RL. Normally, the inlet ports 121 communicate with the outlet ports 122 via fluid lines in the pump body 10a, so the depression force of the brake pedal P is transferred to the wheel brakes FL, RR, RL, and FR.

The fluid line beginning with the output port M1 leads to the wheel brake FL of the front-left wheel and the wheel brake RR of the rear-right wheel and the fluid line beginning with the output port M2 leads to the wheel brake FR of the front-right wheel and the wheel brake RL of the rear-left wheel. In the following description, the fluid line beginning with the output port M1 is referred to as "the first channel" and the fluid line beginning with the output port M2 is referred to as "the second channel".

In the hydraulic pressure unit 10, two control valve sections (control valve means) V corresponding to the wheel brakes FL and RR are provided in the first channel. Similarly, two control valve sections (control valve means) V corresponding to the wheel brakes RL and FR are provided in the second channel. In addition, in the hydraulic pressure unit 10, a reservoir 3, a pump 4, an orifice 5a, a pressure regulator R, and a suction valve 7 are provided in each of the first and second channels. In addition, the hydraulic pressure unit 10 is provided with a common motor 9 for driving the pump 4 in the first channel and the pump 4 in the second channel. In the present embodiment, the pressure sensor 91 is provided only in the second channel.

In the following description, the fluid lines from the output ports M1 and M2 of the master cylinder M to the pressure regulators R are referred to as "output hydraulic pressure lines A1" and the fluid line from the pressure regulator R in the first channel to the wheel brakes FL and RR and the fluid line from the pressure regulator R in the second channel to the wheel brakes RL and FR are respectively referred to as "wheel hydraulic pressure line B". In addition, the fluid lines from the output hydraulic pressure lines A1 to the pumps 4 are referred to as "suction hydraulic pressure lines C", the fluid lines from the pumps 4 to the wheel hydraulic pressure lines B are referred to as "discharge hydraulic pressure lines D", and the fluid lines from the wheel hydraulic pressure lines B to the suction hydraulic pressure lines C are referred to as "release lines E".

The control valve section V is a valve controlling a transfer of a hydraulic pressure from the master cylinder M or the pump 4 to the wheel brakes FL, RR, RL, and FR and can increase, hold, or reduce the wheel cylinder pressure. Therefore, the control valve section V includes the inlet valve 1, the outlet valve 2, and a check valve 1a.

The inlet valve 1 is a normally open solenoid valve provided between the wheel brakes FL, RR, RL, and FR and the master cylinder M (that is, provided in the wheel hydraulic pressure line B). The inlet valve 1 is normally open to allow the brake hydraulic pressure to transfer from the master cylinder M to the wheel brakes FL, FR, RL, and RR. The inlet valve 1 is closed as appropriate by the controller 20 to block the brake hydraulic pressure transferring from the brake pedal P to the wheel brakes FL, FR, RL, and RR.

The outlet valve 2 is a normally closed solenoid valve provided between each of the wheel brakes FL, RR, RL, and FR and each of the reservoirs 3 (that is, between each of the wheel hydraulic pressure lines B and each of the release lines E). Although the outlet valve 2 is normally closed, it drains the brake hydraulic pressure acting on the wheel brakes FL, FR, RL, and RR to the reservoirs 3 when opened by the controller 20 as appropriate.

The check valve 1a is connected in parallel with the inlet valve 1. The check valve 1a allows the brake fluid to flow only from the wheel brakes FL, FR, RL, and RR side to the master cylinder M side. When an input from the brake pedal P is released, even in a state where the inlet valve 1 is closed, the check valve 1a allows the brake fluid to flow from the wheel brakes FL, FR, RL, and RR side to the master cylinder M side.

The reservoir 3 is provided in the release line E and has a function of reserving the brake hydraulic pressure drained when the outlet valve 2 is opened. In addition, a check valve 3a allowing the brake fluid to flow only from the reservoir 3 side to the pump 4 side is provided between the reservoir 3 and the pump 4.

The pump 4 is provided between the suction hydraulic pressure line C leading to the output hydraulic pressure line A1 and the discharge hydraulic pressure line D leading to the wheel hydraulic pressure line B and has a function of sucking the brake fluid reserved in the reservoir 3 and discharging the sucked brake fluid to the discharge hydraulic pressure line D.

The orifice 5a attenuates the pulsation of the pressure of the brake fluid discharged from the pump 4 and the pulsation caused by the operation of the pressure regulator R, which will be described later.

The pressure regulator R has a function of allowing the brake fluid to flow from the output hydraulic pressure line A1 to the wheel hydraulic pressure line B normally and, when the pressure on the wheel cylinder W side is increased by the brake hydraulic pressure generated by the pump 4, adjusting the pressure of the discharge hydraulic pressure line D, the wheel hydraulic pressure line B, and the control valve section V (wheel cylinder W) side to a predetermined value or less while blocking this flow and the pressure regulator R is configured to include selector valves 6 and check valves 6a.

The selector valve 6 is a normally open linear solenoid valve provided between the output hydraulic pressure line A1 leading to the master cylinder M and the wheel hydraulic pressure line B leading to the wheel brakes FL, FR, RL, and RR.

The check valves 6a are connected in parallel with the selector valves 6. These check valves 6a are one-way valves allowing the brake fluid to flow from the output hydraulic pressure line A1 to the wheel hydraulic pressure line B.

The suction valve 7 is a normally closed solenoid valve provided in the suction hydraulic pressure line C and performs switching between the state in which the suction hydraulic pressure line C is opened and the state in which the suction hydraulic pressure line C is blocked.

The pressure sensor 91 detects the brake hydraulic pressure of the output hydraulic pressure line A1 and the detection result is input to the controller 20.

Figure 3:
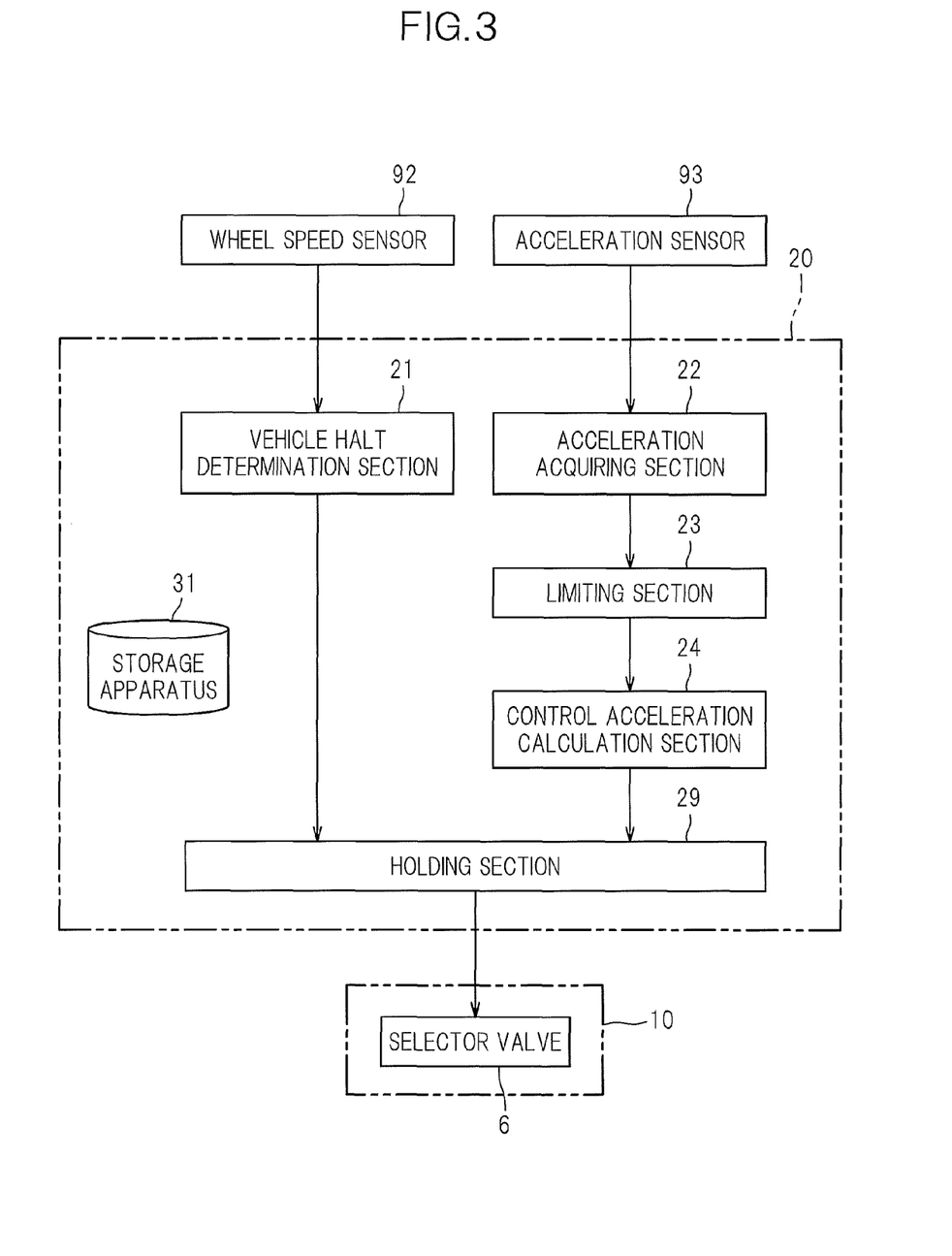
FIG. 3 is a block diagram showing the structure of a controller.

As shown in FIG. 3, the controller 20 includes vehicle halt determination section (vehicle halt determination means) 21, acceleration acquiring section (acceleration acquiring means) 22, limiting section (limiting means) 23, control acceleration calculation section (control acceleration calculation means) 24 as an example of a filter, holding section (holding means) 29, and a storage apparatus 31.

The vehicle halt determination section 21 has a function of acquiring wheel speed information from the wheel speed sensor 92 and, based on the wheel speed, determining whether the vehicle halts. When determining that the vehicle has halted, the vehicle halt determination section 21 outputs a signal indicating that the vehicle has halted to the holding section 29.

The acceleration acquiring section 22 acquires front-rear direction acceleration information from the acceleration sensor 93 as appropriate. The acceleration value acquired this time is output to the limiting section 23. In addition, the acquired acceleration is stored in the storage apparatus 31 as appropriate.

In the embodiment, the acceleration (that is, the acceleration generated when the vehicle CR is accelerated during forward movement or when the vehicle CR is at a halt on an ascending slope) acting on the vehicle CR backward is assumed to be positive. The acceleration (that is, the acceleration generated when the vehicle CR is accelerated during backward movement or when the vehicle CR is at a halt on a descending slope) acting on the vehicle CR forward is assumed to be negative. However, the relationship between positive and negative may be reversed.

The limiting section 23 limits the magnitude of the output value of the acceleration sensor 93 acquired by the acceleration acquiring section 22 within the predetermined limit value Alim and outputs the limited value to the control acceleration calculation section 24. This limit value Alim is preferably set so as to correspond to the maximum inclined angle X of the road surface to be used that is set by the specification of the vehicle CR. Specifically, the holding section 29, which will be described later, sets the upper limit value PHmax of the holding pressure corresponding to the maximum inclined angle X and the limiting section 23 preferably uses a value obtained by adding a predetermined offset amount to the acceleration value corresponding to the upper limit value PHmax of the holding pressure as the predetermined limit value Alim. The reason for adding this offset amount and its magnitude will be described later.

The control acceleration calculation section 24 converts the acceleration (this acceleration is referred to as "the limited acceleration" in this specification) limited by the limiting section to a value (this value is referred to as "the control acceleration" in this specification) corresponding to the holding hydraulic pressure required to halt the vehicle also on an inclined road surface. Specifically, the control acceleration calculation section 24, which is a filter limiting a change in a direction in which the limited acceleration approaches 0, calculates the absolute value of the limited acceleration, limits reduction of the absolute value, and outputs the value. The limitation of a change in the absolute value is performed by limiting the descending gradient of the absolute value to a predetermined gradient.

The control acceleration (after being filtered) obtained by such a process is output to the holding section 29.

Although a method calculating the absolute value of a limited acceleration, limiting reduction of the absolute value, and outputting the value is indicated as an example for ease of understanding, a negative value may be filtered directly without being converted into the absolute value.

Figure 4:
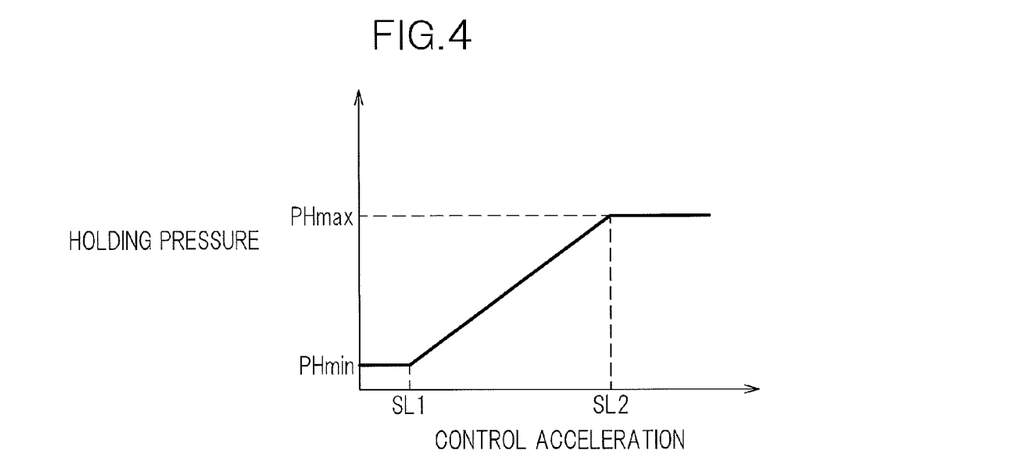
FIG. 4 is a map showing the relationship between the control acceleration and the holding pressure.

The holding section 29 determines the holding pressure according to the control acceleration output by the control acceleration calculation section 24 and, based on the holding pressure, holds the braking force. The determination of the holding pressure is performed by, for example, acquiring the holding pressure from the control acceleration using a map indicating the relationship between the control acceleration and the holding pressure as shown in FIG. 4, which is stored in the storage apparatus 31 in advance. In the map shown in FIG. 4, the holding pressure is proportional to the control acceleration in a predetermined range from SL1 to SL2. The holding pressure has the constant lower limit value PHmin when the control acceleration is less than SL1 or has the constant upper limit value PHmax when the control acceleration is more than SL2. The SL2 in this drawing corresponds to the maximum inclined angle X set in the vehicle CR, which is the use limit. That is, the holding pressure determined by the holding section 29 has the upper limit value.

In the embodiment, the holding is performed by supplying the current corresponding to the holding pressure to the selector valve 6 to close the selector valve 6.

The storage apparatus 31 stores constants required for control, maps, and various types of values used for computation.

Here, the reason for setting the above offset amount and its magnitude will be described with reference to FIG. 5.

Figure 5:
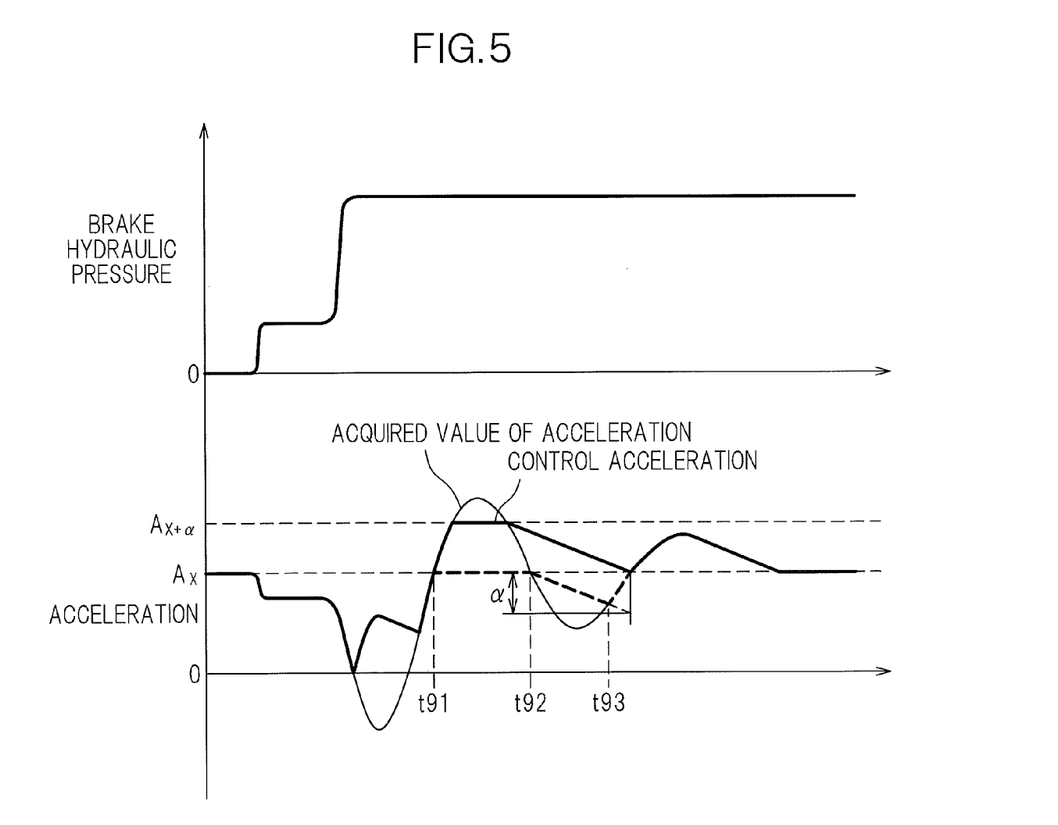
FIG. 5 is a graph showing changes in the brake hydraulic pressure and the acceleration and used to describe sliding down during hard braking on a road surface of a steep gradient and the offset amount.

FIG. 5 shows changes in the brake hydraulic pressure when the hard braking of the vehicle CR is performed at the maximum inclined angle X (forward movement on an ascending slope in the case of FIG. 5) set for the vehicle CR together with the acquired value of acceleration and the limited acceleration. In such hard braking at the maximum inclined angle X, the value of the limited acceleration swings by pitching of the vehicle CR and then gradually converges. When the vehicle CR is inclined backward by pitching (t91 to t92), if the predetermined offset amount is not added to the value of the acceleration $A_X$ corresponding to the upper limit value PHmax of the holding pressure to set the limit value Alim, the limited acceleration is limited by the inclined angle X as indicated by a thick dash line, gradually reduces from t92 to t93 at a predetermined gradient, and temporarily becomes smaller than the acceleration $A_X$ corresponding to the inclined angle X. When the value of the limited acceleration temporarily becomes smaller than the acceleration $A_X$ corresponding to the inclined angle X as described above, the sufficient holding pressure corresponding to the inclined angle X is not generated, possibly causing the vehicle CR to slide down.

Accordingly, to suppress such a shortage of the holding pressure, the limit value Alim is preferably set by adding the predetermined offset amount to the value of the acceleration $A_X$ corresponding to the upper limit value PHmax of the holding pressure. An appropriate value of the offset amount will be described.

The cycle of pitching is determined for each type of the vehicle CR. Since the control acceleration calculation section 24 limits the descending gradient (the change ratio of an acceleration) of the absolute value of an acceleration to a predetermined gradient, the amount of change in the limited acceleration that can be reduced at the above descending gradient (predetermined gradient) during a half cycle of pitching is at most α in FIG. 5. Accordingly, if the offset amount is set to a value (equivalent to α) obtained by multiplying a half cycle of pitching by the predetermined gradient and the limit value Alim is set to the acceleration $A_{X+\alpha}$ corresponding to the inclined angle (X+α), the control acceleration hardly becomes smaller than the acceleration $A_X$ corresponding to the inclined angle X as indicated by a thick solid line in FIG. 5.

The operation of the vehicle brake hydraulic pressure control apparatus 100 configured as described above will be described with reference to FIG. 6.

Figure 6:
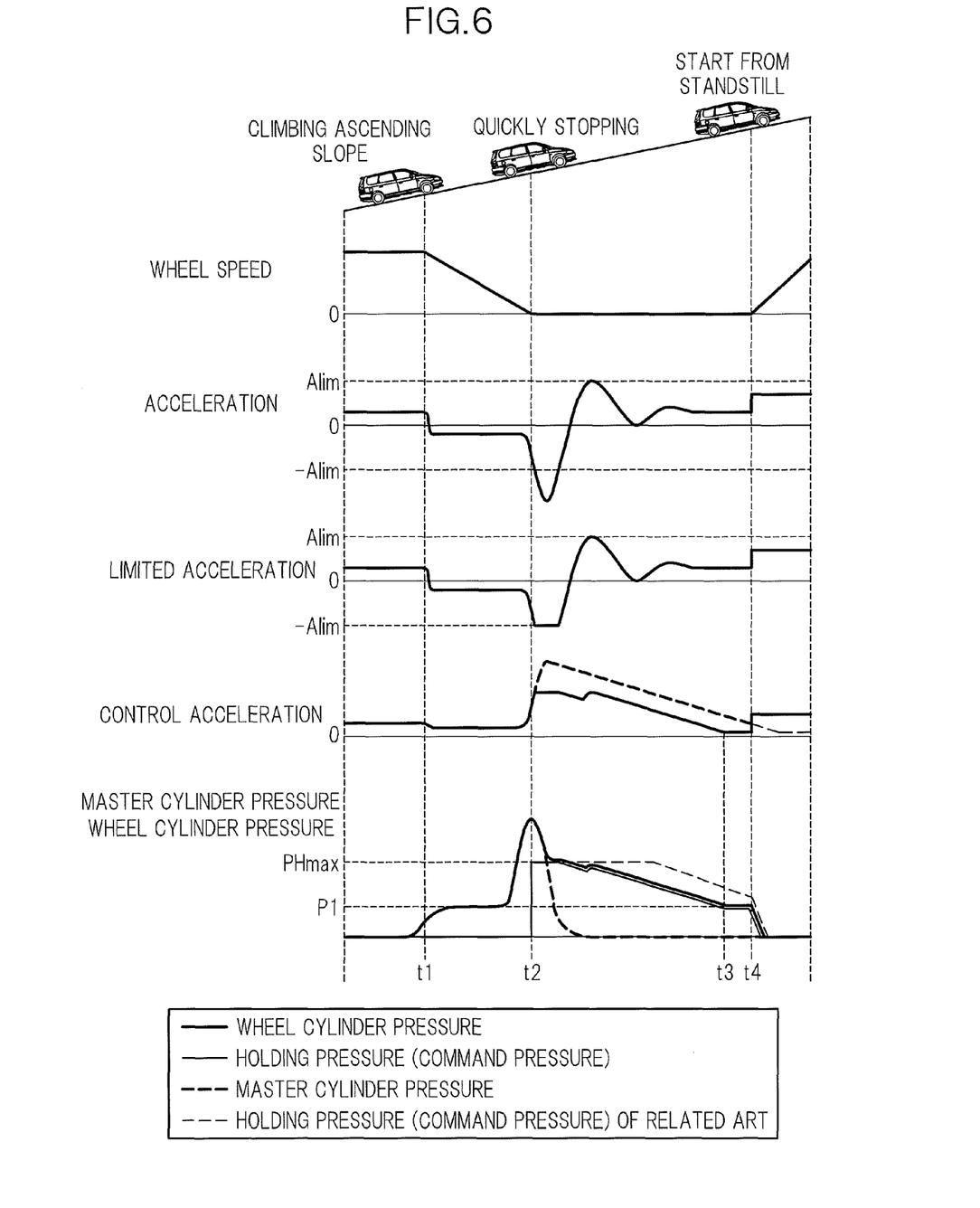
FIG. 6 is a timing chart showing changes in values when vehicle holding control is performed.

FIG. 6 shows changes in values in a situation in which the vehicle CR climbs an ascending slope, quickly halts, and then starts from a standstill. When the vehicle CR starts hard braking at time t1 and halts at time t2, the vehicle halt determination section 21 determines the halt and the holding section 29 starts holding control. The acquired value of the acceleration greatly swings by pitching after the vehicle CR halts and then gradually converges. The magnitude of the value of the limited acceleration is limited within the limit value Alim. In FIG. 6, negative accelerations during a quick halt are limited to −Alim. After the limited acceleration is converted to the absolute value, the descending gradient is limited to a predetermined gradient so that the control acceleration is not easily reduced. In the embodiment, the control acceleration changes as indicated by a solid line in FIG. 6. That is, since the limited acceleration is limited around time t2, the control acceleration does not become so large and relatively quickly converges to the magnitude at time t3 required to halt the vehicle CR on the ascending slope. In contrast, since the related art filters the acceleration value directly without applying limitation, it take very long time until the control acceleration converges to the truly required value of the control acceleration as indicated by a dashed line in the graph of the control acceleration.

When the related art is applied, the control acceleration does not immediately converge and the holding pressure (command pressure) does not also immediately converge to the truly required holding pressure P1 as indicated by a thin dashed line in the graph of the master cylinder pressure and the wheel cylinder pressure. Accordingly, when the vehicle CR starts from a standstill at time t4, dragging feeling may be caused during a start from a standstill since holding is performed with an excess holding pressure.

In contrast, in the embodiment, the holding pressure (command pressure) changes according to the control acceleration as indicated by a thin solid line in the graph of the master cylinder pressure and the wheel cylinder pressure. That is, the holding pressure is indicated by the upper limit value PHmax around time t2, but it converges to the truly required holding pressure P1 relatively quickly as the control acceleration converges. Accordingly, it is possible to achieve a smooth start from a standstill without causing dragging feeling.

As described above, in the vehicle brake hydraulic pressure control apparatus 100 according to the embodiment, the magnitude of the acquired value from the acceleration sensor 93 is limited by the limiting section 23 within the predetermined limit value Alim before being filtered by the control acceleration calculation section 24. Accordingly, even if large pitching movement is caused by hard braking and a large acceleration toward the front or the rear is generated, it is possible to prevent a needlessly large hydraulic pressure from being held for a long time.

In addition, since the holding section 29 sets the upper limit value PHmax of a holding pressure to be determined and the limiting section 23 uses an acceleration value corresponding to the upper limit PHmax of the holding pressure as the predetermined limit value Alim, it is possible to prevent the brake hydraulic pressure from being held at a needlessly large hydraulic pressure, thereby suppressing needless energy consumption.

In addition, since the limiting section 23 uses a value obtained by adding a predetermined offset amount to an acceleration value corresponding to the upper limit PHmax of the holding pressure as the predetermined limit value Alim, it is possible to prevent the holding hydraulic pressure from becoming lower than the necessary holding pressure and the vehicle CR from sliding down because the control gradient is reduced according to a predetermined gradient by effects of pitching when the vehicle CR quickly halts on a road surface of a steep gradient.

In addition, since the predetermined offset amount is set to a value obtained by multiplying a half cycle of pitching of the vehicle CR by the predetermined gradient, the offset amount can be set to a substantially necessary and sufficient magnitude, preventing the brake hydraulic pressure from being held at a needlessly large holding hydraulic pressure and the vehicle from sliding down effectively even during hard braking on a road surface of a steep gradient.

Although an embodiment of the invention has been described above, the invention is not limited to the embodiment and various embodiments are allowed as described below.

Only the holding control of a braking force when the vehicle is at a halt is described in the above embodiment, but the vehicle brake hydraulic pressure control apparatus 100 may be configured to perform ABS control, vehicle behavior stabilization control, or the like. It will be appreciated that the apparatus may perform only the holding of the wheel cylinder pressure without having other functions such as ABS control.

Figure 7:
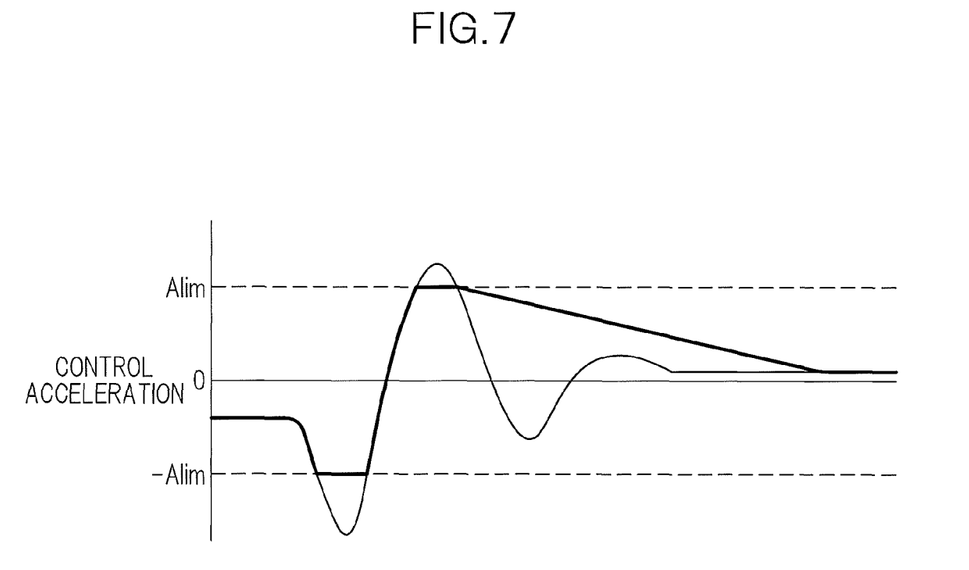
FIG. 7 is a graph showing changes in values after being output by limiting section and then processed by a filter in a modification.

Although the case in which vehicle holding control is performed has been described as an example in the above embodiment, the invention may also be applied when HSA control is performed. In this case, the filter may limit a change of a value output by the limiting section in the direction equivalent to the front of the vehicle. For example, as shown in FIG. 7, filtering may be performed so as to make it hard to change the acceleration in the direction corresponding to the front of the vehicle (so as to make it hard to reduce the acceleration value) after the vehicle halts.

Although the vehicle brake hydraulic pressure control apparatus in the above embodiment is configured to hold the brake hydraulic pressure by controlling the solenoid valve using the hydraulic pressure unit 10, the vehicle brake hydraulic pressure control apparatus according to the invention may also be configured to hold the brake hydraulic pressure using a brake hydraulic pressure generated by an electric motor in a so-called by-wire type brake apparatus that generates a braking force by pressurizing the brake fluid using an electric motor.

The invention claimed is:

1. A vehicle brake hydraulic pressure control apparatus capable of performing braking force holding control that holds a braking force for a vehicle to maintain a halt state when the vehicle is at a halt, the vehicle brake hydraulic pressure control apparatus comprising:
    an acceleration acquiring section for acquiring an output value of an acceleration sensor detecting a front-rear direction acceleration of the vehicle;
    a limiting section for limiting a magnitude of the output value acquired by the acceleration acquiring section within a predetermined limit value;
    a filter limiting a change of a value output by the limiting section in a predetermined direction; and
    a holding section for determining a holding pressure according to a value output by the filter and, based on the holding pressure, holding the braking force.

2. The vehicle brake hydraulic pressure control apparatus according to claim 1,
    wherein the holding section sets an upper limit value of the holding pressure to be determined and
    the limiting section uses, as the predetermined limit value, a value obtained by adding a predetermined offset amount to an acceleration value corresponding to the upper limit value of the holding pressure.

3. The vehicle brake hydraulic pressure control apparatus according to claim 2,
    wherein the filter limits a change in a direction in which the value output by the limiting section approaches 0.

4. The vehicle brake hydraulic pressure control apparatus according to claim 2,
    wherein the filter is configured to limit a change of the value output by the limiting section in a direction equivalent to a front of the vehicle.

5. The vehicle brake hydraulic pressure control apparatus according to claim 2,
    wherein the filter limits the change of the value output by the limiting section in the predetermined direction to a predetermined gradient and
    the predetermined offset amount is set to a value obtained by multiplying a half cycle of pitching of the vehicle by the predetermined gradient.

6. The vehicle brake hydraulic pressure control apparatus according to claim 5,
    wherein the filter limits a change in a direction in which the value output by the limiting section approaches 0.

7. The vehicle brake hydraulic pressure control apparatus according to claim 5,
    wherein the filter is configured to limit a change of the value output by the limiting section in a direction equivalent to a front of the vehicle.

8. The vehicle brake hydraulic pressure control apparatus according to claim 1,
    wherein the holding section sets an upper limit value of the holding pressure to be determined and
    the limiting section uses, as the predetermined limit value, an acceleration value corresponding to the upper limit value of the holding pressure.

9. The vehicle brake hydraulic pressure control apparatus according to claim 8,
    wherein the filter limits a change in a direction in which the value output by the limiting section approaches 0.

10. The vehicle brake hydraulic pressure control apparatus according to claim 8,
    wherein the filter is configured to limit a change of the value output by the limiting section in a direction equivalent to a front of the vehicle.

11. The vehicle brake hydraulic pressure control apparatus according to claim 1,
    wherein the filter limits a change in a direction in which the value output by the limiting section approaches 0.

12. The vehicle brake hydraulic pressure control apparatus according to claim 1,
    wherein the filter is configured to limit a change of the value output by the limiting section in a direction equivalent to a front of the vehicle.

* * * * *